(12) United States Patent
Sakuda et al.

(10) Patent No.: US 10,457,315 B2
(45) Date of Patent: Oct. 29, 2019

(54) STEERING APPARATUS

(71) Applicant: JTEKT CORPORATION, Osaka-shi, Osaka (JP)

(72) Inventors: Masayoshi Sakuda, Kashihara (JP);
Atsumune Nagatani, Kashihara (JP);
Michiaki Yamaoka, Ikoma-gun (JP);
Yoshihito Yoshihara, Kashihara (JP);
Satoki Yoshimura, Shiki-gun (JP); Yu Myohoji, Habikino (JP)

(73) Assignee: JTEKT CORPORATION, Osaka-shi (JP)

( * ) Notice: Subject to any disclaimer, the term of this patent is extended or adjusted under 35 U.S.C. 154(b) by 132 days.

(21) Appl. No.: 15/883,566

(22) Filed: Jan. 30, 2018

(65) Prior Publication Data

US 2018/0229758 A1   Aug. 16, 2018

(30) Foreign Application Priority Data

Feb. 10, 2017   (JP) ................................. 2017-023119

(51) Int. Cl.
*B62D 1/19*    (2006.01)
*B62D 1/184*   (2006.01)

(52) U.S. Cl.
CPC ............. *B62D 1/195* (2013.01); *B62D 1/184* (2013.01); *B62D 1/192* (2013.01)

(58) Field of Classification Search
CPC ......... B62D 1/195; B62D 1/192; B62D 1/184
See application file for complete search history.

(56) References Cited

U.S. PATENT DOCUMENTS

| | | | |
|---|---|---|---|
| 6,109,652 A * | 8/2000 | Kim ................. | B62D 1/192 280/777 |
| 2009/0205459 A1* | 8/2009 | Olgren .............. | B62D 1/184 74/493 |
| 2012/0247258 A1* | 10/2012 | Maniwa ............ | B62D 1/184 74/493 |

(Continued)

FOREIGN PATENT DOCUMENTS

| EP | 1544075 A1 | 6/2005 |
|---|---|---|
| EP | 2910450 A1 | 8/2015 |
| JP | 2009-029224 A | 2/2009 |

OTHER PUBLICATIONS

Jul. 18, 2018 Extended European Search Report issued in European Application No. 18155058.3.

*Primary Examiner* — Darlene P Condra
(74) *Attorney, Agent, or Firm* — Oliff PLC

(57) ABSTRACT

A first sliding member is held by an upper jacket. A second sliding member includes a fixed portion fixed to the first sliding member, and an extension portion that extends in a column axis direction and that has a coupled portion coupled to the fixed portion at a predetermined location in the column axis direction. The second sliding member being clamped by the clamping mechanism slides relative to a supporting member and a lower jacket during a secondary impact. The second sliding member includes a slit that reduces coupling stiffness between the fixed portion and the coupled portion of the extension portion so as to facilitate, in a clamping state of the clamping mechanism, deflection of the coupled portion of the extension portion relative to the fixed portion in a lateral direction as seen from the column axis direction.

5 Claims, 12 Drawing Sheets

(56) References Cited

U.S. PATENT DOCUMENTS

| | | | | |
|---|---|---|---|---|
| 2014/0284909 A1* | 9/2014 | Nakazato | ............... | B62D 1/187 |
| | | | | 280/775 |
| 2015/0096404 A1* | 4/2015 | Martinez | ................ | B62D 1/195 |
| | | | | 74/492 |
| 2015/0239489 A1* | 8/2015 | Matsuno | ................ | B62D 1/187 |
| | | | | 74/493 |
| 2017/0113710 A1* | 4/2017 | Matsuno | ................ | B62D 1/187 |

* cited by examiner

STEERING APPARATUS

The disclosure of Japanese Patent Application No. 2017-023119 filed on Feb. 10, 2017 including the specification, drawings and abstract, is incorporated herein by reference in its entirety.

BACKGROUND OF THE INVENTION

1. Field of the Invention

The invention relates to a steering apparatus.

2. Description of Related Art

There are steering apparatuses that include: a fixed bracket that is coupled to a vehicle body and that is detachable in the event of a secondary impact; a movable bracket fixed to an upper jacket that is slidable relative to a lower jacket in a column axis direction; and a clamping mechanism that clamps the fixed bracket and the movable bracket together, thereby locking a telescopic position and a tilt position. In some known steering apparatuses of this type, a telescopic friction plate that extends in the column axis direction is fixed at one end to the movable bracket, a tilt friction plate is fixed to the fixed bracket, and the clamping mechanism clamps the telescopic friction plate and the tilt friction plate together (refer to, for example, Japanese Patent Application Publication No. 2009-29224 (JP 2009-29224 A)). This locks the telescopic position and the tilt position more firmly.

According to JP 2009-29224 A, the fixed bracket that is detachable from a vehicle body, the upper jacket, the movable bracket, and the friction plates all move together during a secondary impact in the column axis direction. This does not generate impact absorbing load from relative sliding between the telescopic friction plate and the tilt friction plate.

In recent years, there has been a demand for increasing impact absorbing load during a secondary impact. One approach to generating impact absorbing load may be to use an extension member that moves together with the upper jacket, that extends in the column axis direction, and that is clamped by the clamping mechanism, and to cause the extension member to slide, during a secondary impact, relative to a counter member that is immovable in the column axis direction. However, this approach may raise new issues as described below.

When a telescopic adjustment position changes, a clamped position where the extension member is clamped by the clamping mechanism changes accordingly in the longitudinal direction of the extension member (corresponding to the column axis direction). Further, the extension member deflects in a lateral direction (a vehicle width direction) with difficulty at a portion (e.g., an end) that is coupled to a member of the upper jacket at a predetermined location in the longitudinal direction, whereas the extension member deflects in the lateral direction easily at another portion that is far from the coupled portion in the longitudinal direction. Therefore, differences in the telescopic adjustment position may cause variations in impact absorbing load that is generated when the extension member slides relative to a counter member during a secondary impact.

SUMMARY OF THE INVENTION

A purpose of the invention is to provide a steering apparatus that reduces variations in impact absorbing load caused by differences in a telescopic adjustment position.

According to a first aspect of the invention, a steering apparatus includes: an upper jacket having a first end in a column axis direction, the first end being coupled to a steering member; a lower jacket slidably fitted externally on a second end of the upper jacket in the column axis direction; a supporting member that is fixed to a vehicle body and that supports the lower jacket; a clamping mechanism that holds the upper jacket in a position relative to the lower jacket by clamping the lower jacket to the upper jacket; a holding member held by the upper jacket; and a resistive force generating mechanism that is movable together with the holding member in the column axis direction and that slides, when the upper jacket moves relative to the lower jacket during a secondary impact, relative to at least one of the supporting member and the lower jacket so as to generate a resistive force against movement of the upper jacket. In the steering apparatus, the resistive force generating mechanism includes a fixed portion fixed to the holding member, and an extension portion extending in the column axis direction and having a coupled portion that is coupled to the fixed portion at a predetermined location in the column axis direction, the clamping mechanism clamps the lower jacket to the upper jacket via the supporting member and the extension portion, and the resistive force generating mechanism further includes a coupling stiffness reducing mechanism that reduces coupling stiffness between the fixed portion and the coupled portion of the extension portion so as to facilitate, when the clamping mechanism clamps the lower jacket to the upper jacket, deflection of the coupled portion of the extension portion relative to the fixed portion in a lateral direction as seen from the column axis direction.

According to this aspect, in the resistive force generating mechanism, the coupling stiffness reducing mechanism reduces the coupling stiffness between the fixed portion and the coupled portion of the extension portion that is located at a predetermined location in the column axis direction. Thus, when a region of the extension portion that includes the coupled portion is clamped by the clamping mechanism, the coupled portion of the extension portion deflects easily in the lateral direction as seen from the column axis direction. This reduces a difference in deflection strength of the extension portion in the lateral direction between when the region of the extension portion that includes the coupled portion is mainly clamped and when another region of the extension portion that is far from the coupled portion in the column axis direction is mainly clamped. Thus, a change in a clamped position where the extension portion is clamped after a telescopic adjustment is less likely to cause a change in the deflection strength of the extension portion in the lateral direction. Accordingly, the resistive force that is generated, during the secondary impact, by the sliding of the resistive force generating mechanism relative to at least one of the supporting member and the lower jacket is likely to remain unchanged, regardless of where the relative sliding occurs. This reduces variations in impact absorbing load caused by differences in a telescopic adjustment position.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
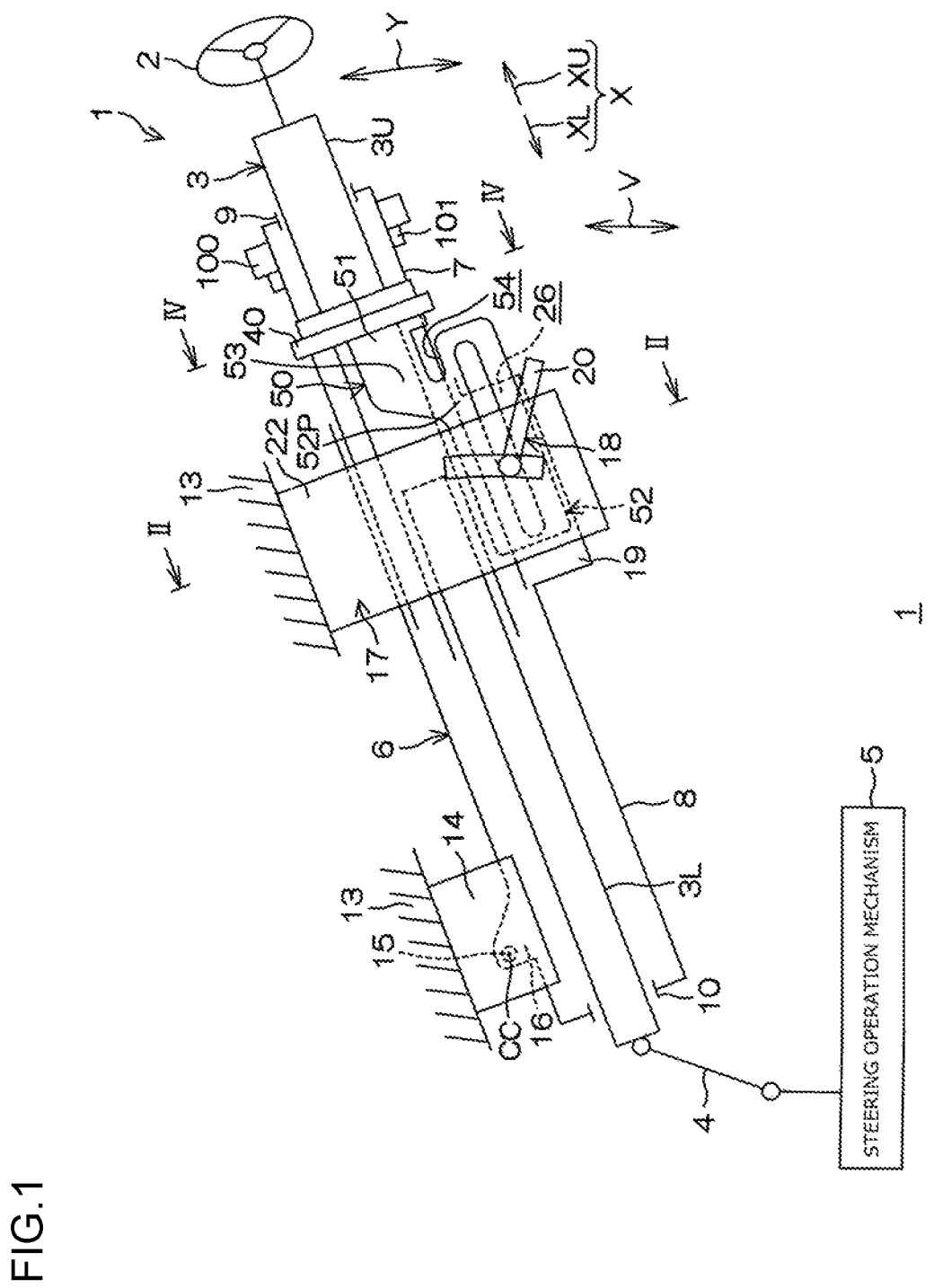
FIG. 1 is a diagram illustrating the schematic structure of a steering apparatus according to a first embodiment of the invention.

Embodiments of the invention will be described in detail below with reference to the accompanying drawings. FIG. 1 is a diagram illustrating the schematic structure of a steering apparatus 1 according to a first embodiment of the invention. The steering apparatus 1 includes a steering shaft 3, a column jacket 6, an intermediate shaft 4, and a steering operation mechanism 5. A steering member 2, such as a steering wheel, is coupled to one end (an axial upper end) of the steering shaft 3. The steering apparatus 1 steers steered wheels (not illustrated) in synchronization with steering of the steering member 2. The steering operation mechanism 5 may be, for example, but not limited to, a rack-and-pinion mechanism.

In the description below, an upper side in a column axis direction X that is an axial direction of the steering shaft 3 is referred to as an axial upper side XU, and a lower side in the column axis direction X is referred to as an axial lower side XL. The steering shaft 3 has a tubular upper shaft 3U and a lower shaft 3L. The upper shaft 3U and the lower shaft 3L are coupled together with a spline fit, a serration fit, or any other suitable fit that allows relative movement between the upper shaft 3U and the lower shaft 3L. The steering member 2 is coupled to one end of the upper shaft 3U on the axial upper side XU.

The column jacket 6 includes the following: an upper jacket 7 having a first end that is coupled to the steering member 2 via the upper shaft 3U; and a lower jacket 8 slidably fitted externally on a second end of the upper jacket 7. The upper jacket 7 is also an inner jacket, and the lower jacket 8 is also an outer jacket. The first end of the upper jacket 7 is coupled to the steering member 2 via the upper shaft 3U. The column axis direction X is also an axial direction of the upper jacket 7 and an axial direction of the lower jacket 8. The axial upper side XU is also the first end side of the upper jacket 7, and the axial lower side XL is also the second end side of the upper jacket 7.

The steering shaft 3 is inserted through the column jacket 6. The upper shaft 3U is supported by a bearing 9 rotatably with respect to the upper jacket 7. The lower shaft 3L is supported by a bearing 10 rotatably with respect to the lower jacket 8. The movement of the upper shaft 3U in the column axis direction X relative to the lower shaft 3L causes the movement of the upper jacket 7 in the column axis direction X relative to the lower jacket 8. The column jacket 6 is telescopically movable together with the steering shaft 3 in the column axis direction X.

The position of the steering member 2 in a vehicle longitudinal direction is adjustable by extending and retracting the steering shaft 3 and the column jacket 6 in the column axis direction X. As such, the steering apparatus 1 has a telescopic adjustment feature. The telescopic adjustment is achieved by sliding the upper jacket 7 within a predetermined telescopic adjustment range. The telescopic adjustment range is an area between an upward adjustment limit position to which an upward adjustment of the upper jacket 7 in the column axis direction X is limited and a downward adjustment limit position to which a downward adjustment of the upper jacket 7 in the column axis direction X is limited. The column jacket 6 is fully extended when the upper jacket 7 is in the upward adjustment limit position and is fully retracted when the upper jacket 7 is in the downward adjustment limit position.

Figure 2:
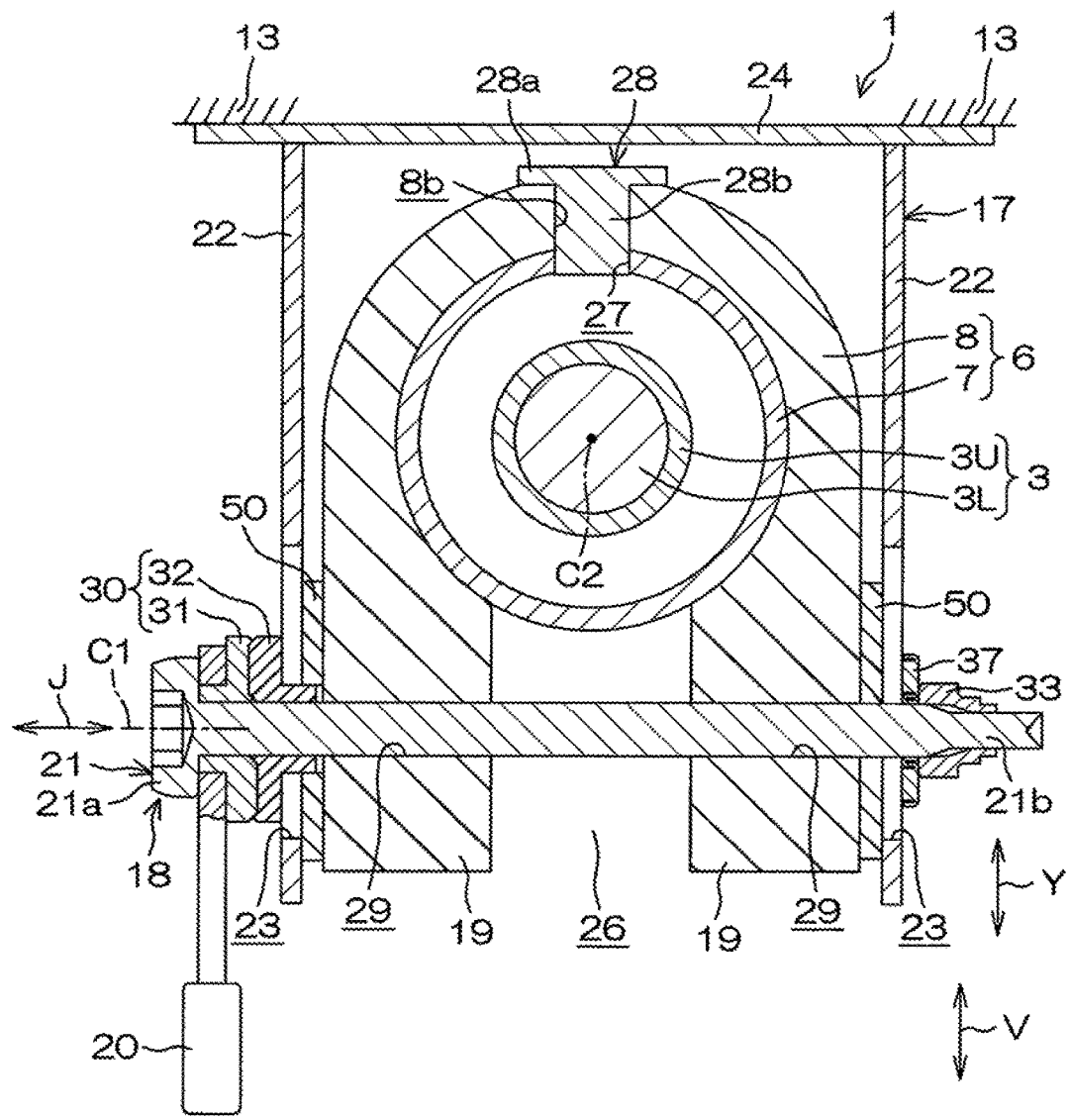
FIG. 2 is a cross-sectional view taken along line II-II in FIG. 1.

FIG. 2 is a cross-sectional view taken along line II-II in FIG. 1. A guide groove 27 having an elongate shape in the column axis direction X is formed in the upper jacket 7. A guided projection 28 that fits in the guide groove 27 and that is movable in the column axis direction X relative to the guide groove 27 is fixed to the lower jacket 8. The guided projection 28 is inserted through an insertion hole 8b formed in the lower jacket 8. The guided projection 28 includes the following: a head portion 28a that abuts against an outer peripheral surface of the lower jacket 8 along the edge of the insertion hole 8b; and a shank portion 28b inserted through the insertion hole 8b. The head portion 28a and the shank portion 28b are formed as one piece. The tip of the shank portion 28b fits in the guide groove 27.

In the telescopic adjustment, abutment of an axial lower end of the guide groove 27 against the guided projection 28 limits the upper jacket 7 to the upward adjustment limit position of the telescopic adjustment range. This prevents the upper jacket 7 from coming off the lower jacket 8. Further, in the telescopic adjustment, abutment of an axial upper end of the guide groove 27 against the guided projection 28 limits the upper jacket 7 to the downward adjustment limit position of the telescopic adjustment range.

Referring to FIG. 1, the steering apparatus 1 includes the following: a mounting bracket 14 fixed to a vehicle body 13; a tilt center shaft 15 supported by the mounting bracket 14; a column bracket 16 fixed to an outer periphery of the lower jacket 8 and rotatably supported by the tilt center shaft 15. The steering shaft 3 and the column jacket 6 are pivotable in a tilt direction Y (substantially in a vertical direction) about a tilt center CC that is the central axis of the tilt center shaft 15.

The position of the steering member 2 in the tilt direction Y is adjustable by pivoting the steering shaft 3 and the column jacket 6 about the tilt center CC. As such, the steering apparatus 1 has a tilt adjustment feature. Referring to FIG. 2, the steering apparatus 1 includes the following: a supporting member 17, such as a bracket, that is fixed to the vehicle body 13 and that supports the lower jacket 8; and a clamping mechanism 18 that locks the position of the upper jacket 7 after the tilt adjustment and the telescopic adjustment. The clamping mechanism 18 clamps, via the supporting member 17, a pair of clamped portions 19 that are integral with an upper part of the lower jacket 8 in the column axis direction X.

The lower jacket 8 has a slit 26 that extends from an axial upper end 8a of the lower jacket 8 toward the axial lower side XL. The slit 26 is provided between the clamped portions 19. The clamping mechanism 18 is mounted to the clamped portions 19. When the clamping mechanism 18 clamps the clamped portions 19, the lower jacket 8 is elastically compressed radially, thus clamping the upper jacket 7.

The supporting member 17 includes the following: an attachment plate 24 attached to the vehicle body 13; and a pair of side plates 22 extending downward in the tilt direction Y from the opposite ends of the attachment plate 24. The side plates 22 each have a tilt long hole 23 that extends in the tilt direction Y and that is used for the tilt adjustment. The clamped portions 19 of the lower jacket 8 are located between the side plates 22. Each of the clamped portions 19 has a plate shape that extends along an inner surface 22a of a corresponding one of the side plates 22. Each of the clamped portions 19 has a shaft insertion hole 29 that is circular.

The clamping mechanism 18 includes a clamping shaft 21 (an insertion shaft) and an operating lever 20 that rotates the clamping shaft 21. A central axis C1 of the clamping shaft 21 corresponds to the center of rotation of the operating lever 20. The clamping shaft 21 may be, for example, a bolt. The clamping shaft 21 is inserted through the tilt long holes 23 in the side plates 22 of the supporting member 17 and the shaft insertion holes 29 in the clamped portions 19 of the lower jacket 8. In the tilt adjustment, the clamping shaft 21 and the lower jacket 8 move relative to the supporting member 17. At this time, the clamping shaft 21 moves in the tilt long holes 23 in the tilt direction Y.

A head portion 21a provided at one end of the clamping shaft 21 is fixed to the operating lever 20 and is rotatable together with the operating lever 20. The clamping mechanism 18 further includes a force conversion mechanism 30 that is interposed between the head portion 21a of the clamping shaft 21 and one of the side plates 22 (the left side plate 22 in FIG. 2, hereinafter referred to as the first side plate 22). The force conversion mechanism 30 converts operating torque of the operating lever 20 to an axial force (a clamping force that clamps the pair of side plates 22). The force conversion mechanism 30 includes a rotating cam 31 and a first clamping member 32. The rotating cam 31 is coupled to the operating lever 20 and is rotatable together with the operating lever 20. The movement of the rotating cam 31, relative to the clamping shaft 21, in a clamping shaft direction J is limited. The clamping shaft direction J is a direction in which the central axis C1 extends. The first clamping member 32 clamps the first side plate 22 through cam engagement with the rotating cam 31. The first clamping member 32 is a non-rotating cam whose rotation is limited. The first clamping member 32 faces one of the clamped portions 19 (the left clamped portion 19 in FIG. 2, hereinafter referred to as the first clamped portion 19) of the lower jacket 8 in the clamping shaft direction J.

The clamping mechanism 18 further includes the following: a second clamping member 33 that clamps the other of the side plates 22 (the right side plate 22 in FIG. 2, hereinafter referred to as the second side plate 22); and a needle roller bearing 37 interposed between the second clamping member 33 and the second side plate 22. The second clamping member 33 is a nut threadedly engaged with a threaded portion 21b provided at the other end of the clamping shaft 21. The second clamping member 33 clamps the second side plate 22 via the needle roller bearing 37. The second clamping member 33 faces the other of the clamped portions 19 (the right clamped portion 19 in FIG. 2, hereinafter referred to as the second clamped portion 19) of the lower jacket 8 in the clamping shaft direction J.

The rotating cam 31, the first clamping member 32, and the needle roller bearing 37 are supported on the outer periphery of the clamping shaft 21. The first clamping member 32 fits in the tilt long hole 23 in the first side plate 22 such that rotation of the first clamping member 32 is limited. When the operating lever 20 rotates in a lock direction, the rotating cam 31 rotates relative to the first clamping member 32, and the first clamping member 32 moves in a direction away from the rotating cam 31 along the clamping shaft direction J. As such, the side plates 22 are clamped by being sandwiched between the clamping members 32 and 33.

At this time, each of the side plates 22 of the supporting member 17 clamps the corresponding clamped portion 19 of the lower jacket 8. This limits the movement of the lower jacket 8 in the tilt direction Y so that a tilt lock is achieved. Further, when the clamped portions 19 are clamped, the lower jacket 8 is elastically compressed radially and clamps the upper jacket 7 accordingly. Thus, the upper jacket 7 is locked (held) in a desired telescopic adjustment position within the telescopic adjustment range so that a telescopic lock is achieved.

As described above, the clamping mechanism 18 holds the upper jacket 7 in a position relative to the lower jacket 8 by clamping the lower jacket 8 to the upper jacket 7 via the supporting member 17. In contrast, when the operating lever 20 rotates in an unlock direction, the first clamping member 32 moves, with rotation of the rotating cam 31, in a direction toward the rotating cam 31 along the clamping shaft direction J. Thus, the side plates 22 are declamped from the clamping members 32 and 33, so that the tilt adjustment and the telescopic adjustment are available.

Figure 3:
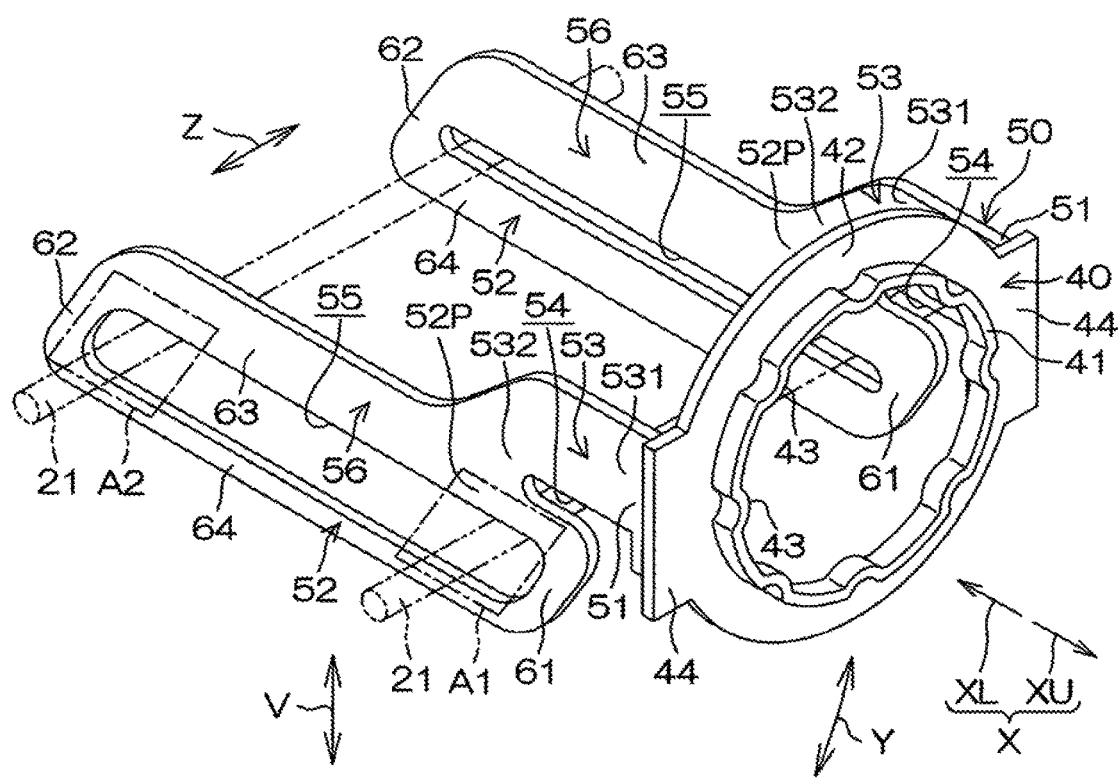
FIG. 3 is a perspective view illustrating first and second sliding members of the steering apparatus.
Figure 4A:
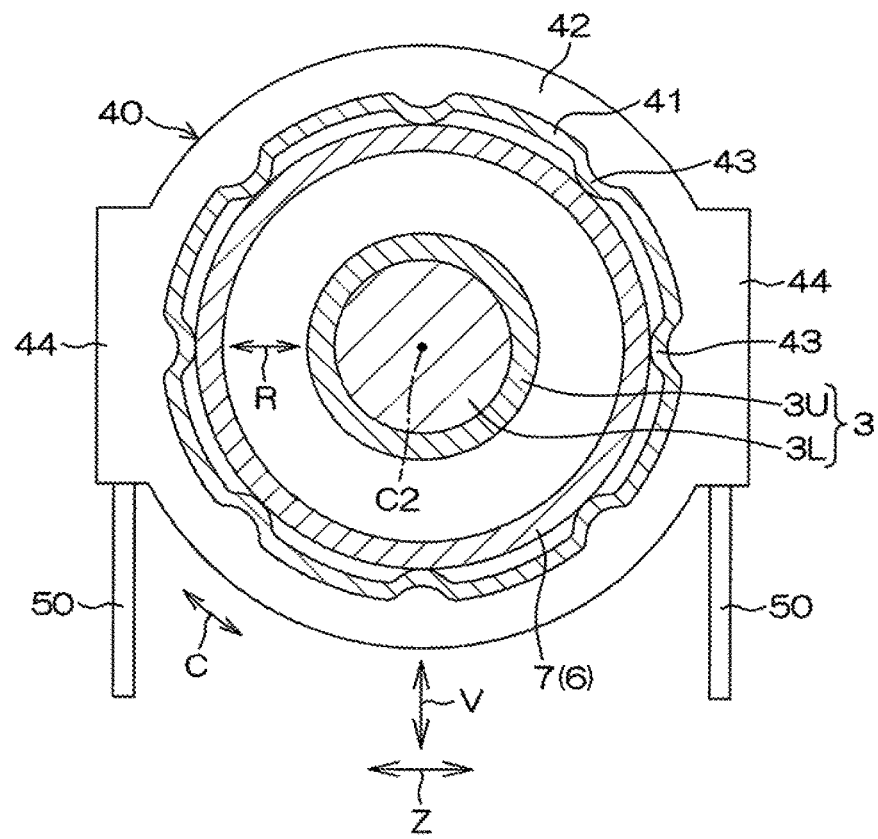
FIG. 4A is a cross-sectional view taken along line IV-IV in FIG. 1.
Figure 4B:
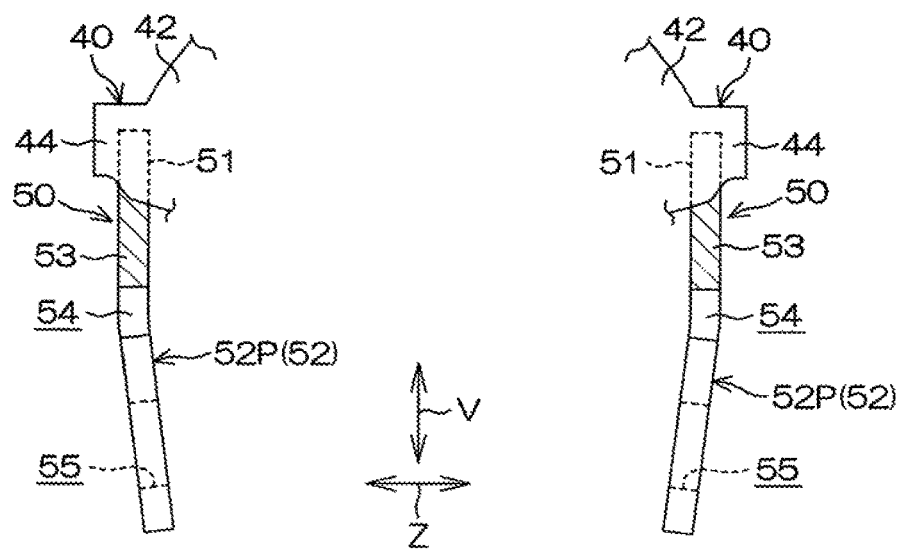
FIG. 4B is a partially cutaway view of FIG. 4A.
Figure 5:
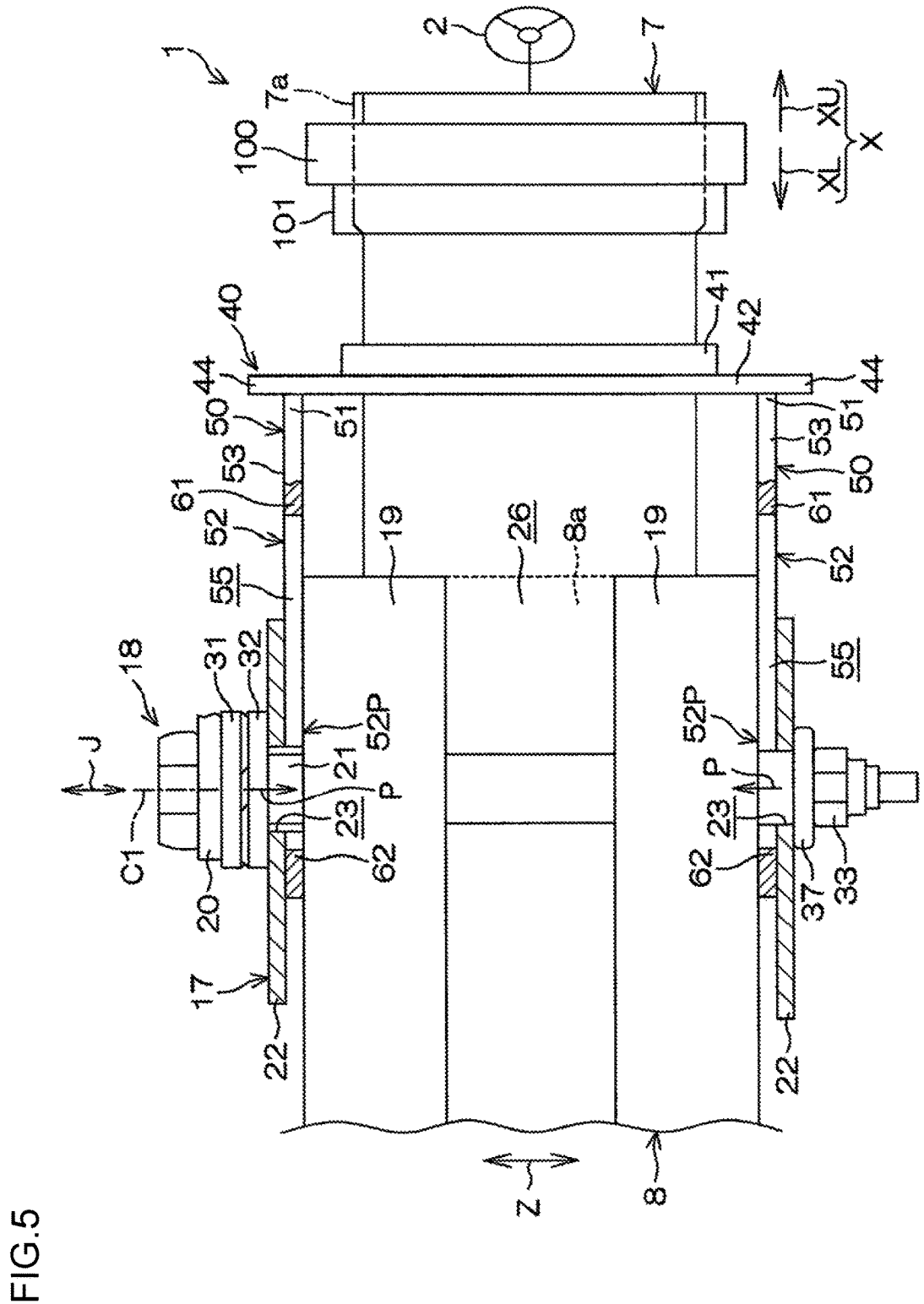
FIG. 5 is a bottom view of an area around the first sliding member and the second sliding member.

Referring to FIG. 3, the steering apparatus 1 further includes a first sliding member 40 and a pair of second sliding members 50. FIG. 4A is a cross-sectional view taken along line IV-IV in FIG. 1. FIG. 4B is a partially cutaway view of FIG. 4A. FIG. 5 is a bottom view of an area around the first sliding member 40 and the second sliding members 50. Referring to FIG. 4A, the first sliding member 40 is attached to the upper jacket 7 and is frictionally slidable relative to the upper jacket 7. The first sliding member 40 is a holding member held by the upper jacket 7 through press-fit and has a feature to hold the second sliding members 50 to the upper jacket 7. Frictional sliding between the first sliding member 40 and the upper jacket 7 is hereinafter referred to as first relative sliding. A resistive force, generated by the first relative sliding, against the movement of the upper jacket 7 is hereinafter referred to as a first resistive force G1. The first sliding member 40 forms a first resistive force generating mechanism.

The first sliding member 40 includes the following: a tubular fitting portion 41 fitted on an outer peripheral surface of the upper jacket 7; an annular flange portion 42 extending outward from an end of the fitting portion 41 in a radial direction of the upper jacket 7; and multiple (eight in this embodiment) projecting portions 43 that project from an inner peripheral surface of the fitting portion 41 toward the outer peripheral surface of the upper jacket 7 and that are in contact with the outer peripheral surface of the upper jacket 7. The first resistive force G1 generated by the first relative sliding is adjustable by adjusting the strength of the projecting portions 43 and a frictional force between the outer peripheral surface of the upper jacket 7 and the projecting portions 43. The projecting portions 43 are evenly spaced in a circumferential direction C of the outer peripheral surface of the upper jacket 7. This arrangement of the projecting portions 43 facilitates stabilizing the first resistive force G1.

The first sliding member 40 further includes a pair of fixing portions 44 that fix the second sliding members 50. Each of the fixing portions 44 extends radially outward from an outer edge of the flange portion 42 in a radial direction R. The radial direction R is a radial direction with respect to a central axis C2 of the upper jacket 7. The term "radially outward" refers to a direction away from the central axis C2 in the radial direction R. The fixing portions 44 are displaced from each other by 180 degrees in the circumferential direction C so that the upper jacket 7 is located between the fixing portions 44.

Referring to FIG. 5, a component 100 to be attached, such as a combination switch or a key lock, is attached to the upper jacket 7. The component 100 is attached to a portion of the upper jacket 7 that is located closer to the axial upper side XU than a portion of the upper jacket 7 that the first sliding member 40 is attached to. The steering apparatus 1 further includes a facing member 101 fixed to the upper jacket 7. In the column axis direction X, the facing member 101 is located closer to the steering member 2 (i.e., closer to the axial upper side XU) than the first sliding member 40 and faces the first sliding member 40. In the upper jacket 7, an axial lower end of the facing member 101 is located between the component 100 and the first sliding member 40. The facing member 101 may be, for example, a bracket for attaching the component 100 to the upper jacket 7. The bracket is fixed to the upper jacket 7 by welding, clinching, press-fit, or any other suitable fixing method. The facing member 101 is not limited to a bracket for attaching the component 100 to the upper jacket 7. For example, the facing member 101 may be a bracket for attaching a vehicle component (e.g., a column cover, a wire harness, a knee airbag, etc.) other than the component 100 to the upper jacket 7.

Referring to FIG. 3, each of the second sliding members 50 is a plate-like member extending from the first sliding member 40 toward the axial lower side XL. The second sliding members 50 are formed as separate pieces from the first sliding member 40 and then are fixed to the first sliding member 40 by welding or the like. Thus, the second sliding members 50 are movable together with the first sliding member 40 in the column axis direction X. Each of the second sliding members 50 is joined to an axial lower end surface of a corresponding one of the fixing portions 44 of the first sliding member 40. In the telescopic adjustment, the second sliding members 50 move together with the upper jacket 7 as well as the first sliding member 40.

Referring to FIG. 5, the second sliding members 50 are spaced from each other across the upper jacket 7 in the clamping shaft direction J and face each other in the clamping shaft direction J. One of the second sliding members 50 is located between the first clamping member 32 and the first clamped portions 19 (the upper clamped portion 19 in FIG. 5). The one of the second sliding members 50 is located between the first side plate 22 (the upper side plate 22 in FIG. 5) and the first clamped portion 19. The other of the second sliding members 50 is located between the second clamping member 33 and the second clamped portions 19 (the lower clamped portion 19 in FIG. 5). The other of the second sliding members 50 is located between the second side plate 22 (the lower side plate 22 in FIG. 5) and the second clamped portion 19.

In a clamping state of the clamping mechanism 18 (i.e., in a state where the lower jacket 8 is clamping the upper jacket 7), each of the second sliding members 50 is kept pressed against a corresponding one of the clamped portions 19 by a corresponding one of the clamping members 32 and 33. The clamping mechanism 18 presses each of the second sliding members 50 against the corresponding clamped portion 19 in a pressing direction P coincident with the clamping shaft direction J. A direction along the pressing direction P toward the corresponding clamped portion 19 is hereinafter referred to as the downstream side of the pressing direction P.

Each of the second sliding members 50 is held between the corresponding side plate 22 and the corresponding clamped portion 19 by being pressed against the corresponding clamped portion 19 by the corresponding one of the clamping members 32 and 33. In this state, each of the second sliding members 50 is frictionally slidable relative to the corresponding side plate 22 and the corresponding clamped portion 19. Frictional sliding that is caused, while the clamping mechanism 18 clamps the lower jacket 8 to the upper jacket 7, between the pair of second sliding members 50 and each of the pair of side plates 22 and the pair of clamped portions 19 is hereinafter referred to as second relative sliding. A resistive force, generated by the second relative sliding, against the movement of the upper jacket 7 is hereinafter referred to as a second resistive force G2. The second sliding members 50 form a second resistive force generating mechanism. The second resistive force G2 is adjustable by adjusting the fictional force between the second sliding members 50 and each of the side plates 22 and the clamped portions 19. According to the first embodiment, the first resistive force G1 generated by the first relative sliding is greater than the second resistive force G2 generated by the second relative sliding (G1>G2).

Referring to FIG. 1 and FIG. 3, each of the second sliding members 50 includes the following: a fixed portion 51 fixed to the first sliding member 40 by, for example, welding; an extension portion 52 extending parallel to the column axis direction X; a coupling portion 53 that couples, to the fixed portion 51, a coupled portion 52P of the extension portion 52 that is located at a predetermined location in the column axis direction X; and a slit 54 that serves as a coupling stiffness reducing mechanism for reducing coupling stiffness between the fixed portion 51 and the coupled portion 52P of the extension portion 52.

As illustrated in FIG. 3, the extension portion 52 has a substantially rectangular plate shape with the long sides extending in the column axis direction X. The extension portion 52 has an axial long hole 55 extending in the column axis direction X. The clamping shaft 21 is inserted through the axial long hole 55 in the extension portion 52. The axial long hole 55 in the extension portion 52 is defined by a first defining section 61, a second defining section 62, a third defining section 63, and a fourth defining section 64. The first defining section 61 defines the axial long hole 55 from the axial upper side XU. The second defining section 62 defines the axial long hole 55 from the axial lower side XL. The third defining section 63 and the fourth defining section 64 extend parallel to the column axis direction X and define the axial long hole 55 from above and below in a vertical direction V. The coupled portion 52P of the extension portion 52 that is coupled via the coupling portion 53 to the fixed portion 51 is located in the third defining section 63 at a predetermined location in the column axis direction X.

The coupling portion 53 includes the following: a first coupling portion 531 coupled to the fixed portion 51 from the axial lower side XL; and a second coupling portion 532 that is interposed between the first coupling portion 531 and the extension portion 52 and that is coupled to the coupled portion 52P of the extension portion 52 from above in the vertical direction V. The slit 54 reduces the coupling stiffness between the fixed portion 51 and the coupled portion 52P of the extension portion 52 so as to facilitate deflection of the coupled portion 52P of the extension portion 52 relative to the fixed portion 51 in a lateral direction Z as seen from the column axis direction X, as illustrated in FIG. 4B. Specifically, the slit 54 is located above and adjacent to the coupled portion 52P of the extension portion 52 in the vertical direction V and extends in the column axis direction X (refer to FIG. 3).

As illustrated in FIG. 3, the slit 54 is interposed between the first coupling portion 531 of the coupling portion 53 and the extension portion 52 so as to separate the first coupling portion 531 and the extension portion 52 from each other. One end of the slit 54 is open toward the axial upper side XU. The other end of the slit 54 extends toward the second coupling portion 532 of the coupling portion 53. Thus, the slit 54 reduces the width over which the second coupling portion 532 of the coupling portion 53 is coupled to the extension portion 52 in the column axis direction X.

Referring to FIG. 5, in the telescopic adjustment, the second sliding members 50 move together with the upper jacket 7 in the column axis direction X. In the telescopic adjustment, the clamping shaft 21 moves relative to the second sliding members 50 by moving in the axial long holes 55 along the column axis direction X. When the upper jacket 7 is in any position within the telescopic adjustment range, the clamping shaft 21 is spaced from both the first defining section 61 and the second defining section 62 that define the axial long hole 55. Specifically, in the telescopic adjustment, even when the upper jacket 7 is in the downward adjustment limit position, the clamping shaft 21 is not contact with the first defining section 61 that defines the axial long hole 55. In the telescopic adjustment, even when the upper jacket 7 is in the upward adjustment limit position, the clamping shaft 21 is not contact with the second defining section 62 that defines the axial long hole 55.

In each of the second sliding members 50, particularly, a part (the periphery of the axial long hole 55) of the extension portion 52 that faces a corresponding one of the clamping members 32 and 33 is firmly held between the side plate 22 and the clamped portion 19. During the second relative sliding, therefore, in the extension portion 52, the third defining section 63 and the fourth defining section 64 that are located above and below the axial long hole 55 in the vertical direction V mainly slide frictionally on the side plate 22 and the clamped portion 19. The third defining section 63 and the fourth defining section 64 of the extension portion 52 form a sliding portion 56 that mainly slides frictionally on the side plate 22 and the clamped portion 19.

Next, how the steering apparatus 1 works when a secondary impact occurs in the event of a vehicle collision will be described. The term "secondary impact" means that a driver of a vehicle impacts the steering member 2 in the event of a collision of the vehicle. Unless otherwise specified, the description below assumes that the secondary impact occurs with the upper jacket 7 in the upward adjustment limit position. When the secondary impact occurs in the clamping state of the clamping mechanism 18, the impact force is transmitted to the upper jacket 7 through the steering member 2. The lower jacket 8 is supported by the pair of side plates 22 of the supporting member 17 that is fixed to the vehicle body 13. For this reason, during the secondary impact, the upper jacket 7 moves toward the axial lower side XL, relative to the supporting member 17 and the lower jacket 8. Thus, the upper jacket 7 slides frictionally on the lower jacket 8 so that the column jacket 6 is retracted. A resistive force that is caused when the upper jacket 7 slides frictionally on the lower jacket 8 in the clamping state of the clamping mechanism 18 is hereinafter referred to as a column resistive force F.

Figure 6A:
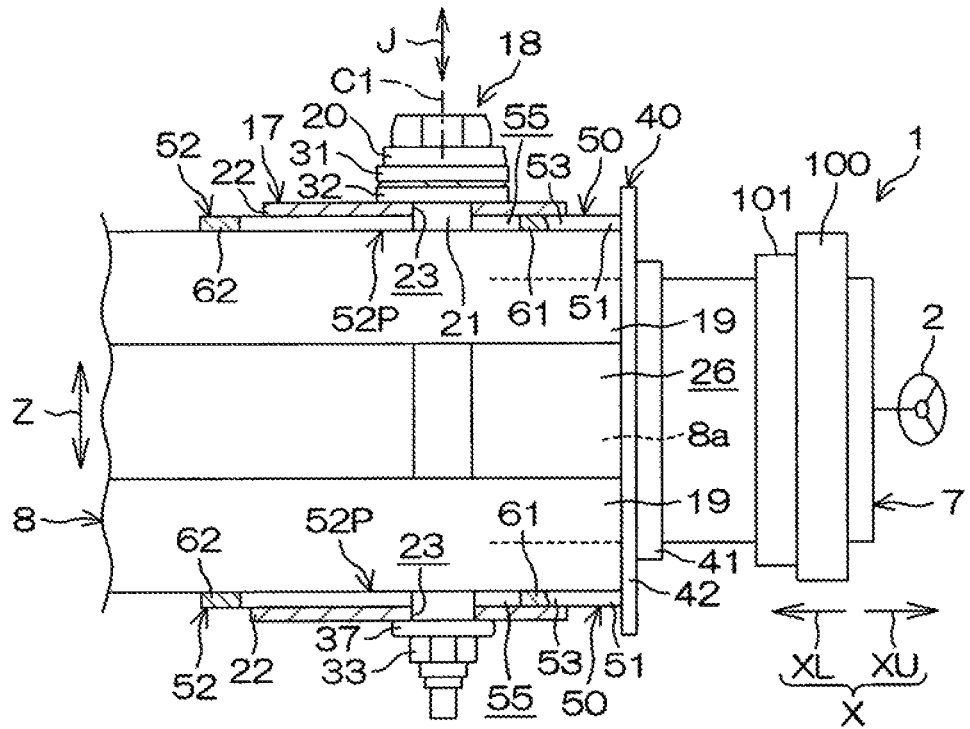
FIG. 6A is a diagram illustrating an area around the sliding members in the event of a secondary impact.
Figure 6B:
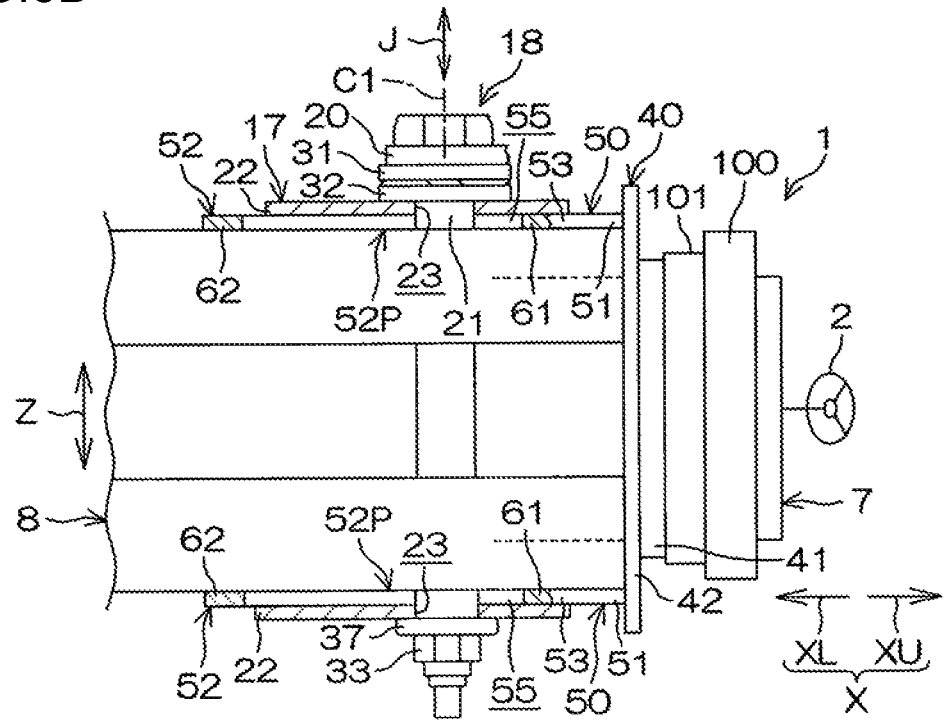
FIG. 6B is a diagram illustrating the area around the sliding members in the event of a secondary impact.
Figure 7:
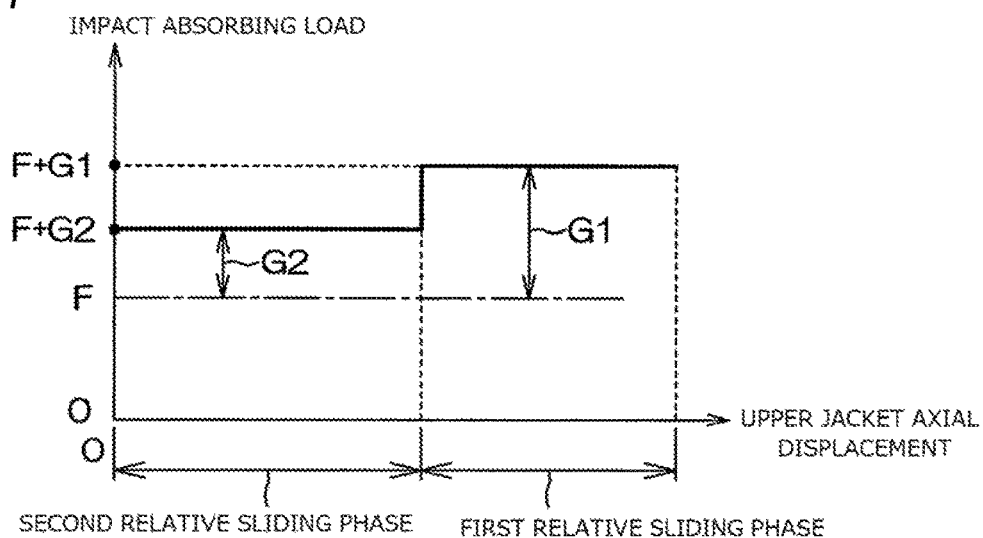
FIG. 7 is a graph illustrating the relationship between an axial displacement of an upper jacket and an impact absorbing load in the event of a secondary impact.

FIG. 6A is a diagram illustrating an area around the first sliding member 40 and the second sliding members 50 in the event of the secondary impact. FIG. 6B illustrates a state appearing after the state of FIG. 6A. FIG. 7 is a graph illustrating the relationship between an axial displacement of the upper jacket 7 and an impact absorbing load in the event of the secondary impact. In FIG. 7, the horizontal axis represents the axial displacement of the upper jacket 7, and the vertical axis represents the impact absorbing load. The origin on the horizontal axis is set to the position of the upper jacket 7 in the column axis direction X when the column jacket 6 is fully extended (i.e., when the upper jacket 7 is in the upward adjustment limit position).

According to the first embodiment, as illustrated in FIG. 7, the first resistive force G1 generated by the first relative sliding is greater than the second resistive force G2 generated by the second relative sliding (G1>G2). Thus, the second relative sliding starts first. The movement of the second sliding members 50 relative to the supporting member 17 and the lower jacket 8 changes the sliding portions 56. Specifically, after the secondary impact occurs, the sliding portions 56 move over time toward the first sliding member 40 (toward the axial upper side XU).

The impact absorbing load during an initial phase of the secondary impact (corresponding to a second relative sliding phase in FIG. 7) corresponds to the sum (F+G2) of the second resistive force G2 generated by the second relative sliding and the column resistive force F caused by the frictional sliding of the upper jacket 7 on the lower jacket 8 (refer to FIG. 7). The abutment of the axial lower end of the guide groove 27 against the guided projection 28 occurs somewhere during the second relative sliding phase, thus breaking the guided projection 28. The second relative sliding continues even after the guided projection 28 has been broken. Thus, regardless of the position of the upper jacket 7 after the telescopic adjustment, the second relative sliding starts immediately after the secondary impact occurs.

As illustrated in FIG. 6A, the first sliding member 40 abuts against the axial upper end 8a of the lower jacket 8. This abutment limits the movement of the first sliding member 40 and the second sliding members 50 toward the axial lower side XL, relative to the lower jacket 8 and the supporting member 17. Thus, the movement of the second sliding members 50 relative to the supporting member 17 and the lower jacket 8 is stopped, so that the second relative sliding is stopped. At this time, the axial upper end 8a of the lower jacket 8 serves as a second stopper for stopping the second relative sliding. In contrast, the upper jacket 7 continues moving toward the axial lower side XL, relative to the lower jacket 8. Thus, the relative movement (the first relative sliding) between the upper jacket 7 and the first sliding member 40 starts.

The impact absorbing load during a phase after the start of the first relative sliding (corresponding to a first relative sliding phase in FIG. 7) corresponds to the sum (F+G1) of the first resistive force G1 generated by the first relative sliding and the column resistive force F caused by the frictional sliding of the upper jacket 7 on the lower jacket 8 (refer to FIG. 7). When the facing member 101 abuts against the first sliding member 40 from the axial upper side XU, the first relative sliding is stopped (refer to FIG. 6B).

According to the first embodiment, the second sliding members 50 are attached to the first sliding member 40 (a holding member) and are movable together with the first sliding member 40. Thus, the movement of the upper jacket 7 relative to the lower jacket 8 during the secondary impact generates either relative sliding (the first relative sliding) between the upper jacket 7 and the first sliding member 40, or relative sliding (the second relative sliding) between the second sliding members 50 and each of the lower jacket 8 and the supporting member 17.

According to the first embodiment, the first resistive force G1 generated by the first relative sliding is greater than the second resistive force G2 generated by the second relative sliding. Thus, as illustrated in FIG. 7, the following phases are obtainable during the secondary impact in accordance with the axial position of the upper jacket 7 relative to the lower jacket 8: the second relative sliding phase that generates impact absorbing load (F+G2) that is the sum of the second resistive force G2 and the column resistive force F caused by the frictional sliding of the upper jacket 7 on the lower jacket 8; and the first relative sliding phase that follows the second relative sliding phase and that generates impact absorbing load (F+G1) that is the sum of the first resistive force G1 and the column resistive force F. Setting the magnitudes of the first resistive force G1 and the second resistive force G2 appropriately allows setting impact absorbing load characteristics appropriately.

Further, as described below, the first embodiment makes it possible to reduce variations in the impact absorbing load caused by differences in the telescopic adjustment position during the second relative sliding. As illustrated in FIG. 3, after the telescopic adjustment, when the clamping shaft 21 is located in the axial long hole 55 at a location close to the coupled portion 52P of each extension portion 52, the clamping mechanism 18 mainly clamps a first region A1 of the extension portion 52 that includes the coupled portion 52P and an area near the coupled portion 52P.

In contrast, when the clamping shaft 21 is located in the axial long hole 55 at a location (i.e., at a location in proximity to the second defining section 62) farthest from the location close to the coupled portion 52P, the clamping mechanism 18 mainly clamps a second region A2 of each extension portion 52 that includes the second defining section 62 and an area near the second defining section 62. Assuming that there is no slit 54, the amount of deflection of the first region A1 in the lateral direction Z caused when the clamping mechanism 18 mainly clamps the first region A1 is considerably smaller than the amount of deflection of the second region A2 in the lateral direction Z caused when the clamping mechanism 18 mainly clamps the second region A2.

In contract, according to the first embodiment, the action of the slit 54 as the coupling stiffness reducing mechanism facilitates deflection of the coupled portion 52P of the extension portion 52 (the first region A1 including the coupled portion 52P), relative to the fixed portion 51, in the lateral direction Z as seen from the column axis direction X. Thus, a change in a clamped position where the extension portion 52 is clamped after the telescopic adjustment is less likely to cause a change in the deflection strength of the extension portion 52 in the lateral direction Z. Accordingly, the second resistive force G2 generated during the secondary impact by the relative sliding of the second sliding member 50 is likely to remain unchanged, regardless of where the relative sliding occurs. This reduces variations in the impact absorbing load caused by differences in the telescopic adjustment position.

As described above, the change in the clamped position where the extension portion 52 is clamped after the telescopic adjustment is less likely to cause the change in the deflection strength of the extension portion 52 in the lateral direction Z. This also reduces variations in operating load of the operating lever 20 of the clamping mechanism 18, caused by differences in the clamped position. Further, using the slit 54 extending in the column axis direction X as the coupling stiffness reducing mechanism makes it possible to reduce the coupling stiffness between the fixed portion 51 and the coupled portion 52P of the extension portion 52 by a simple structure.

Further, each of the second sliding members 50 is held between the corresponding clamped portion 19 of the lower jacket 8 and the corresponding side plate 22 of the supporting member 17 clamped by the clamping mechanism 18. Thus, during the first relative sliding, the first sliding member 40 moving together with the second sliding members 50 is suppressed from vibrating in a direction perpendicular to the direction of the first relative sliding. This stabilizes the impact absorbing load during the secondary impact.

Figure 8:
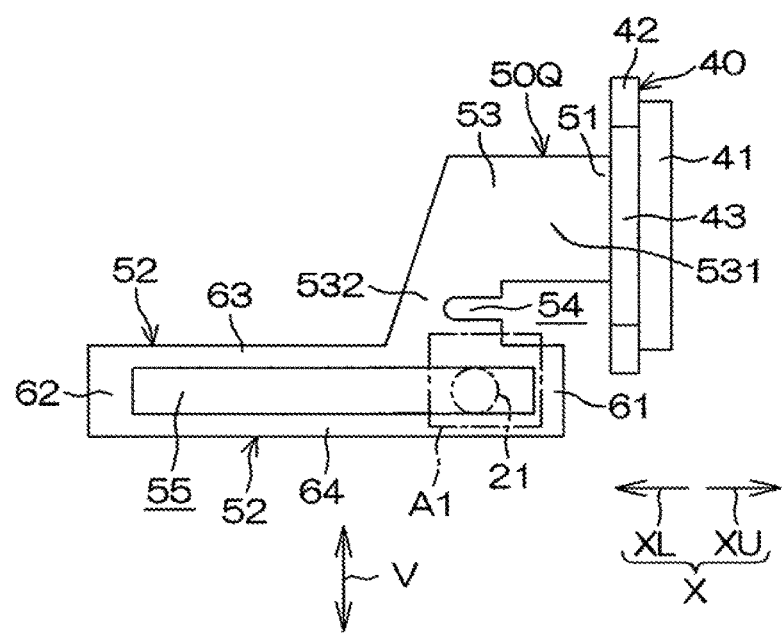
FIG. 8 is a side view of a first sliding member and a second sliding member of a steering apparatus according to a second embodiment of the invention.

FIG. 8 is a side view of the first sliding member 40 and second sliding members 50Q of a steering apparatus according to a second embodiment of the invention. The second sliding members 50Q according to the second embodiment illustrated in FIG. 8 differ mainly in the following aspect from the second sliding members 50 according to the first embodiment illustrated in FIG. 3. In each of the second sliding members 50Q, a slit 54 is separated upward from an extension portion 52 in the vertical direction V. The slit 54 is formed in a second coupling portion 532 of a coupling portion 53. According to the second embodiment, since there is a greater distance between the slit 54 and the clamping shaft 21 in the vertical direction V, a longer arm length (corresponding to the distance between the slit 54 and the clamping shaft 21) is provided for a bending moment that has a fulcrum point near the slit 54 and that is applied when a first region A1 of the extension portion 52 that includes a coupled portion 52P is clamped after the telescopic adjustment. The amount of deflection of the first region A1 in the lateral direction Z is increased accordingly.

This more effectively reduces the change in the deflection strength of the extension portion 52 in the lateral direction Z, relative to the change in the clamped position after the telescopic adjustment. Thus, the second resistive force G2 generated during the secondary impact by the relative sliding of the second sliding members 50Q is likely to remain unchanged, regardless of where the relative sliding occurs. This more effectively reduces variations in the impact absorbing load caused by differences in the telescopic adjustment position. Although not illustrated in the drawings, the slit 54 of the first embodiment illustrated in FIG. 3 and the second embodiment illustrated in FIG. 8 may be replaced with a concave groove that extends in the column axis direction X without penetrating the second sliding member 50 (50Q) in the lateral direction Z.

Figure 9A:
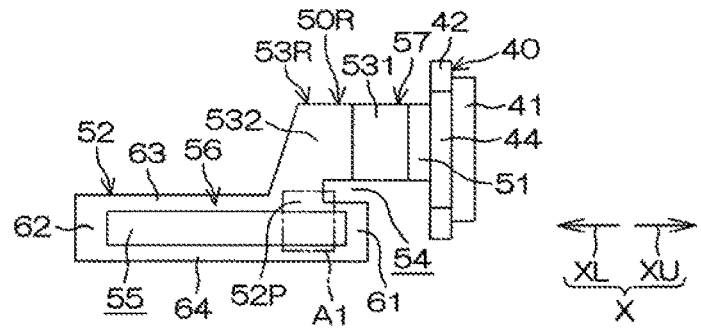
FIG. 9A is a schematic side view of a first sliding member and a second sliding member of a steering apparatus according to a third embodiment of the invention.
Figure 9B:
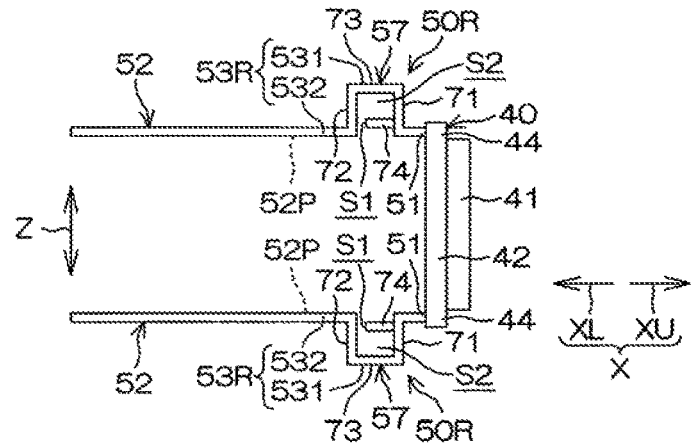
FIG. 9B is a schematic plan view of the first sliding member and the second sliding member.
Figure 9C:
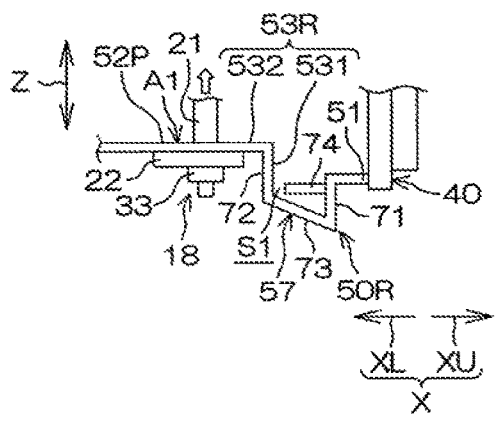
FIG. 9C is a schematic plan view illustrating the main part of the first sliding member, the second sliding member, and a clamping mechanism.

FIG. 9A is a schematic side view of the first sliding member 40 and second sliding members 50R of a steering apparatus according to a third embodiment of the invention. FIG. 9B is a schematic plan view of the first sliding member 40 and the second sliding members 50R. FIG. 9C is a schematic plan view illustrating the main part of the first sliding member 40, the second sliding members 50R, and the clamping mechanism 18.

The second sliding members 50R according to the third embodiment illustrated in FIGS. 9A and 9B differ mainly in the following aspect from the second sliding members 50 according to the first embodiment illustrated in FIG. 3. In each of the second sliding members 50R, a coupling portion 53R that couples a fixed portion 51 to a coupled portion 52P of an extension portion 52 includes the following: a first coupling portion 531 coupled to the fixed portion 51 from the axial lower side XL; and a second coupling portion 532 that is interposed between the first coupling portion 531 and the extension portion 52 and that is coupled to the coupled portion 52P of the extension portion 52 from above in the vertical direction V.

Each of the second sliding members 50R further includes the coupling stiffness reducing mechanism an elastically deformable bent portion 57 that couples the fixed portion 51 to the coupled portion 52P of the extension portion 52 and that undulates in the lateral direction Z as seen from the vertical direction V, as illustrated in FIG. 9B. Specifically, the first coupling portion 531 includes the elastically deformable bent portion 57, and the bent portion 57 has a rectangular C-shape that projects outward in the lateral direction Z. The bent portion 57 includes a plate-like first section 71, a plate-like second section 72, and a plate-like third section 73. As illustrated in FIG. 9B that is a diagram viewed from the vertical direction V, the first section 71 extends from the fixed portion 51 outward in the lateral direction Z as seen from the vertical direction V The second section 72 extends from the second coupling portion 532 outward in the lateral direction Z as seen from the vertical direction V. The third section 73 joins together the outer ends of the first section 71 and the second section 72 in the lateral direction Z. The first section 71 and the second section 72 are aligned parallel to the lateral direction Z. The third section 73 is perpendicular to the first section 71 and the second section 72.

Figure 9D:
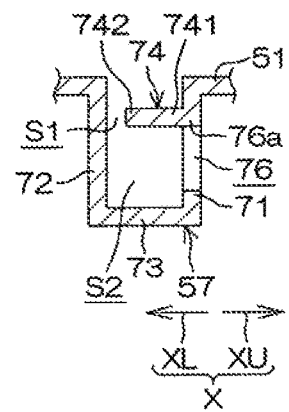
FIG. 9D is an enlarged cross-sectional view of a structure around a bent portion.

Each of the second sliding members 50 further includes a plate-like limiting portion 74 that extends from the first section 71 of the bent portion 57 toward the axial lower side XL. FIG. 9D is an enlarged cross-sectional view of a structure around the bent portion 57. As illustrated in FIG. 9D, the limiting portion 74 includes a first end 741 and a second end 742. The first end 741 is coupled to an edge 76a (the edge close to the fixed portion 51) of an opening 76 in the first section 71. The second end 742 is located in proximity to the second section 72, but separated by a clearance S1 from the second section 72. The limiting portion 74 is cantilevered by the first section 71. The limiting portion 74 may be cut in and bent from the first section 71. The limiting portion 74 is aligned parallel to the third section 73 and is separated by a clearance S2 from the third section 73 in the lateral direction Z.

As illustrated in FIG. 9C, when the clamping mechanism 18 clamps the first region A1 of the extension portion 52 that includes the coupled portion 52P, the bent portion 57 (the coupling stiffness reducing mechanism) is elastically deformed such that an angle formed between the first section 71 and the third section 73 and an angle formed between the third section 73 and the second section 72 are changed. This allows the second coupling portion 532 and the coupled portion 52P of the extension portion 52 that is coupled to the second coupling portion 532 to deflect more easily in the lateral direction Z.

The clearance S1 between the limiting portion 74 and the second section 72 of the bent portion 57 and the clearance S2 between the limiting portion 74 and the third section 73 of the bent portion 57, so that the limiting portion 74 does not hinder elastic deformation of the bent portion 57 toward a clamping portion in the lateral direction Z. Although not illustrated in the drawings, during the secondary impact, the first section 71 and the second section 72 of the bent portion 57 approach each other by the width of the clearance S1, so that the second end 742 of the limiting portion 74 abuts against the second section 72 of the bent portion 57. This abutment limits deformation of the bent portion 57 in the column axis direction X. As such, during the secondary impact, the limiting portion 74 limits, to a predetermined limit amount (the amount corresponding to the width of the clearance S1), the amount of deformation of the bent portion 57 in the column axis direction X.

Figure 10:
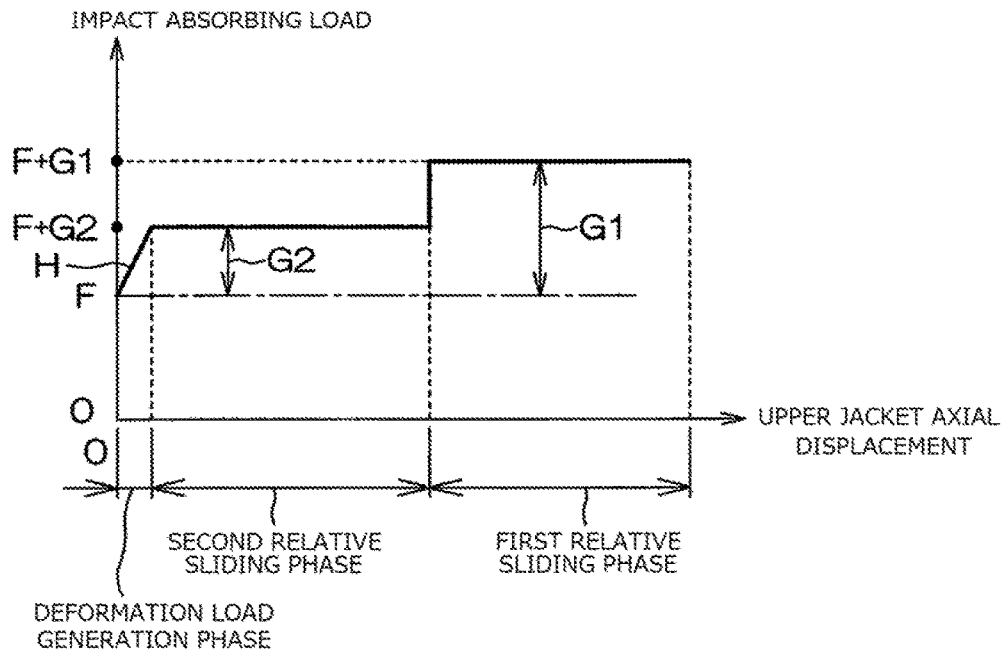
FIG. 10 is a graph according to the third embodiment and illustrating the relationship between an axial displacement of an upper jacket and an impact absorbing load in the event of a secondary impact.

The third embodiment uses the bent portion 57 that is elastically deformable in the lateral direction Z in the clamping state of the clamping mechanism 18, thus making it possible to reduce the coupling stiffness between the fixed portion 51 and the coupled portion 52P of the extension portion 52 by a simple structure. This reduces variations in the impact absorbing load caused by differences in the telescopic adjustment position, as in the first embodiment. Further, during the secondary impact, the limiting portion 74 limits the amount of deformation of the bent portion 57 in the column axis direction. During the secondary impact before the deformation of the bent portion 57 is limited by the limiting portion 74 (i.e., in a deformation load generation phase prior to the start of the second relative sliding phase in FIG. 10), the sum (F+H) of a column resistive force F caused by frictional sliding of the upper jacket 7 on the lower jacket 8 and a deformation load H of the bent portion 57 in the column axis direction X is used as the impact absorbing load.

During the secondary impact after the deformation of the bent portion 57 is limited by the limiting portion 74 (i.e., after the start of the second relative sliding phase), the sum (F+G2) of the column resistive force F and the second resistive force G2 generated by the second relative sliding of the extension portions 52 of the second sliding members 50R on the supporting member 17 and the lower jacket 8 is used as the impact absorbing load. Setting the limit amount appropriately allows setting impact absorbing characteristics appropriately in accordance with the axial displacement of the upper jacket 7 relative to the lower jacket 8.

Figure 11A:
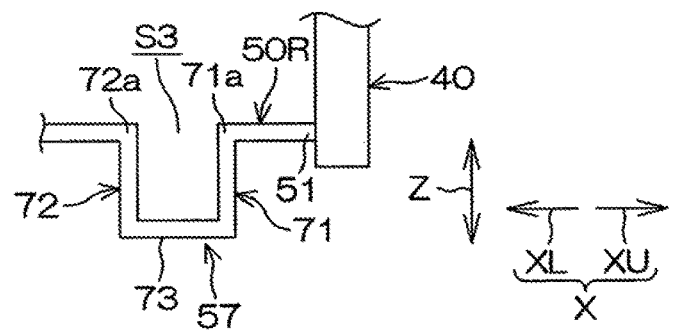
FIG. 11A is a diagram illustrating a structure around a bent portion of a steering apparatus according to a fourth embodiment of the invention.
Figure 11B:
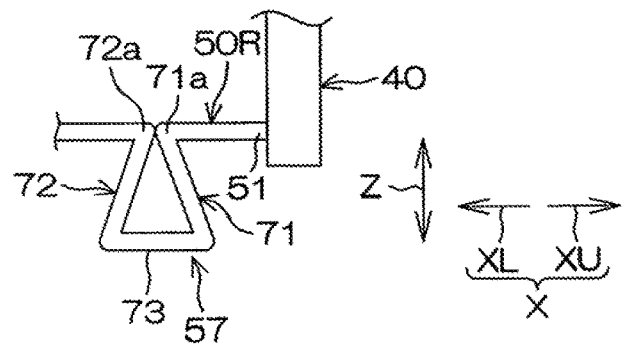
FIG. 11B is a diagram illustrating the structure around the bent portion of the steering apparatus according to the fourth embodiment of the invention.

Next, a fourth embodiment is described. FIGS. 11B and 11B are schematic diagrams illustrating a structure around a bent portion 57 according to the fourth embodiment. FIG. 11A illustrates a state after the telescopic adjustment. FIG. 11B is a state where deformation of the bent portion 57 in the column axis direction X is limited to a predetermined limit amount during the secondary impact. The fourth embodiment differs from the third embodiment mainly in that a base end 71a of a first section 71 and a base end 72a of a second section 72 abut against each other during the secondary impact, so that deformation of the bent portion 57 in the column axis direction X is limited to the limit amount (corresponding to the width of a clearance S3 between the first section 71 and the second section 72 in the column axis direction X).

Figure 12:
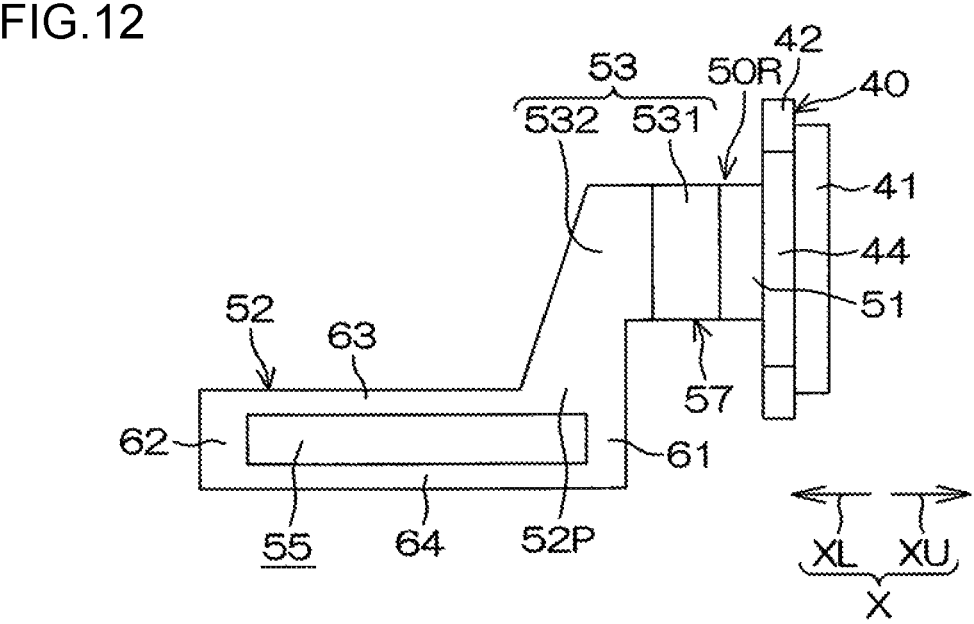
FIG. 12 is a schematic side view of a first sliding member and a second sliding member of a steering apparatus according to a fifth embodiment of the invention.

Thus, according to the fourth embodiment, the base end 71a of the first section 71 and the base end 72a of the second section 72 form a limiting portion that limits, to the limit amount, deformation of the bent portion 57 in the column axis direction X during the secondary impact. As such, the limiting portion according to the fourth embodiment has a simpler structure. In the third embodiment illustrated in FIG. 9A, both the slit 54 and the bent portion 57 are used as the coupling stiffness reducing mechanism. Alternatively, as in a fifth embodiment illustrated in FIG. 12, only the bent portion 57 may be used as the coupling stiffness reducing mechanism.

Figure 13A:
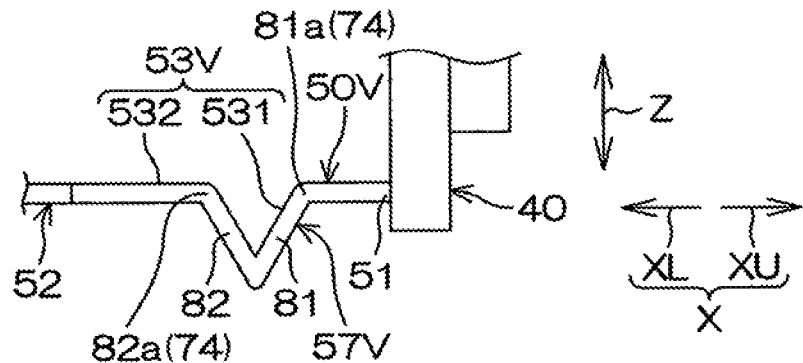
FIG. 13A is a schematic plan view illustrating the main part of a first sliding member, a second sliding member, and a clamping mechanism of a steering apparatus according to a sixth embodiment of the invention.
Figure 13B:
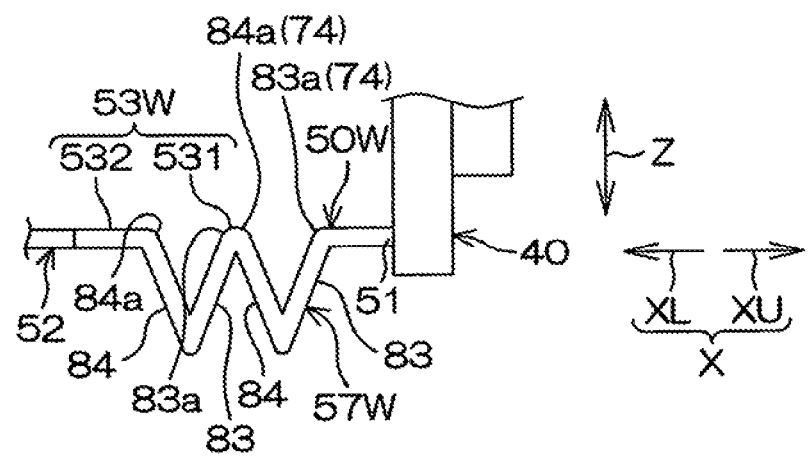
FIG. 13B is a schematic plan view illustrating the main part of a first sliding member, a second sliding member, and a clamping mechanism of a steering apparatus according to a seventh embodiment of the invention.
Figure 13C:
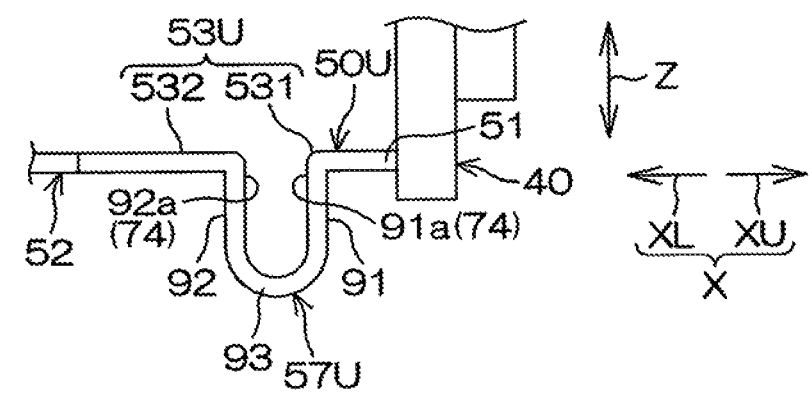
FIG. 13C is a schematic plan view illustrating the main part of a first sliding member, a second sliding member, and a clamping mechanism of a steering apparatus according to an eighth embodiment of the invention.

FIGS. 13A, 13B, and 13C are schematic plan views illustrating the main part of a first sliding member, second sliding members, and a clamping mechanism of steering apparatuses according to sixth, seventh, and eighth embodiments of the invention, respectively. FIGS. 13A, 13B, and 13C illustrate modifications of a bent portion. As illustrated in FIG. 13A, in each of second sliding members 50V according to the sixth embodiment, a first coupling portion 531 of a coupling portion 53V includes an elastically deformable bent portion 57V having a V-shape that projects outward in the lateral direction Z as seen from the vertical direction V. The bent portion 57V has a pair of plate-like sections 81 and 82. The plate-like sections 81 and 82 are joined at a predetermined angle and are inclined oppositely to each other relative to the lateral direction Z as seen from the vertical direction V. The plate-like sections 81 and 82 cause the bent portion 57V to undulate in the lateral direction Z.

As illustrated in FIG. 13B, in each of second sliding members 50W according to the seventh embodiment, a first coupling portion 531 of a coupling portion 53W includes an elastically deformable bent portion 57W having a W-shape that projects outward in the lateral direction Z as seen from the vertical direction V. The bent portion 57W has two pairs of plate-like sections 83 and 84. In each of the two pairs, the plate-like sections 83 and 84 are joined at a predetermined angle and are inclined oppositely to each other relative to the lateral direction Z as seen from the vertical direction V. The two pairs of plate-like sections 83 and 84 cause the bent portion 57W to undulate in the lateral direction Z.

As illustrated in FIG. 13C, in each of second sliding members 50U according to the eighth embodiment, a first coupling portion 531 of a coupling portion 53U includes an elastically deformable curved portion 57U having a U-shape that projects outward in the lateral direction Z as seen from the vertical direction V The curved portion 57U includes: a pair of sections 91 and 92 that extend parallel to the lateral direction Z and that are spaced from each other in the column axis direction X; and a curved section 93 that joins together the sections 91 and 92.

The sixth and seventh embodiments use the bent portions 57V and 57W, respectively, that are elastically deformable in the lateral direction Z in the clamping state of the clamping mechanism 18, thus making it possible to reduce the coupling stiffness between the fixed portion 51 and the coupled portion 52P of the extension portion 52 by a simple structure. The eighth embodiment uses the curved portion 57U that is elastically deformable in the lateral direction Z in the clamping state of the clamping mechanism 18, thus making it possible to reduce the coupling stiffness between the fixed portion 51 and the coupled portion 52P of the extension portion 52 by a simple structure. This reduces variations in the impact absorbing load caused by differences in the telescopic adjustment position, as in the first embodiment.

Although not illustrated in the drawings, according to the sixth embodiment, sections (these sections form a limiting portion) that include at least base ends 81a and 82a of the pair of sections 81 and 82 of the bent portion 57V abut against each other during the secondary impact, so that deformation of the bent portion 57V in the column axis direction X is limited to the limit amount. Although not illustrated in the drawings, according to the seventh embodiment, sections (these sections form a limiting portion) that include at least base ends 83a and 84a of each of the two pairs of sections 83 and 84 of the bent portion 57W abut against each other during the secondary impact, so that deformation of the bent portion 57W in the column axis direction X is limited to the limit amount.

Although not illustrated in the drawings, according to the eighth embodiment, sections (these sections form a limiting portion) that include at least base ends 91a and 92a of the pair of sections 91 and 92 of the curved portion 57U abut against each other during the secondary impact, so that deformation of the curved portion 57U in the column axis direction X is limited to the limit amount. According to the sixth, seventh, and eighth embodiments, during the secondary impact before the deformation is limited by the limiting portion, a deformation load of each of the bent portions 57V and 57W and the curved portion 57U is used as the impact absorbing load. In contrast, during the secondary impact after the deformation is limited by the limiting portion, a sliding load generated by relative sliding of the extension portion 52 of each of the second sliding members 50V, 50W, and 50U on the supporting member 17 and the lower jacket 8 is used as the impact absorbing load.

Figure 14:
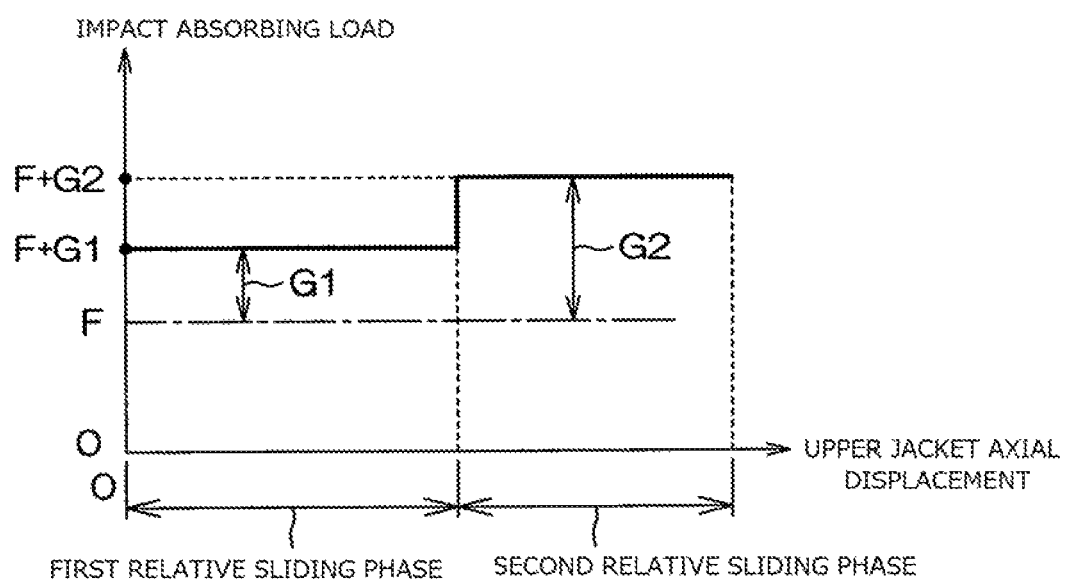
FIG. 14 is a graph according to a ninth embodiment of the invention and illustrating the relationship between an axial displacement of an upper jacket and an impact absorbing load in the event of a secondary impact.

Although not illustrated in the drawings, a limiting portion having the same structure as the limiting portion 74 according to the third embodiment illustrated in FIG. 9D may be added to one of the paired sections 81 and 82 according to the sixth embodiment, one of the paired sections 83 and 84 according to the seventh embodiment, and one of the paired sections 91 and 92 according to the eighth embodiment. The invention is not limited to the embodiments described above and may be modified in various ways. A ninth embodiment of the invention as one example of modifications will be described below. According to the ninth embodiment, as illustrated in FIG. 14, the second resistive force G2 is set greater than the first resistive force G1 (G1<G2). When the facing member 101 as a stopper abuts against the first sliding member 40 during the secondary impact after the start of the first relative sliding, the movement of the first sliding member 40 and the second sliding members 50, relative to the upper jacket 7, toward the axial lower side XL is limited. Thus, the first relative sliding is stopped, and the stop of the first relative sliding starts the second relative sliding. The structure of the ninth embodiment that sets the second resistive force G2 greater than the first resistive force G1 (G1<G2) is applicable to any of the first to eighth embodiments.

The rectangular C-shaped bent portion 57 of the second sliding member 50R according to the third embodiment of FIGS. 9A to 9D and according to the fourth embodiment of FIG. 11A, the V-shaped bent portion 57V of the second sliding member 50V according to the fourth embodiment of FIG. 11A, the W-shaped bent portion 57W of the second sliding member 50W according to the seventh embodiment of FIG. 13B, and the U-shaped curved portion 57U of the second sliding member 50U according to the eighth embodiment of FIG. 13C may be respectively made of a different material from the material of the portions of the second sliding members 50R, 50V, 50W, and 50U other than the bent portions 57, 57V, 57W, and 57U (for example, a material that is easier to be elastically deformed than that of the other portions).

At least two of the C-shaped bent portion 57 according to the fourth embodiment of FIG. 11A, the V-shaped bent portion 57V according to the sixth embodiment of FIG. 13A, the W-shaped bent portion 57W according to the seventh embodiment of FIG. 13B, and the U-shaped curved portion 57U according to the eighth embodiment of FIG. 13C may be arranged in the column axis direction X. Although not illustrated in the drawings, each of the second sliding members 50 may be located between the corresponding side plate 22 of the supporting member 17 and the corresponding one of the clamping members 32 and 33.

What is claimed is:

1. A steering apparatus comprising:
   an upper jacket having a first end in a column axis direction, the first end being coupled to a steering member;
   a lower jacket slidably fitted externally on a second end of the upper jacket in the column axis direction;
   a supporting member that is fixed to a vehicle body and that supports the lower jacket;
   a clamping mechanism that holds the upper jacket in a position relative to the lower jacket by clamping the lower jacket to the upper jacket;
   a holding member held by the upper jacket; and
   a resistive force generating mechanism that is movable together with the holding member in the column axis direction and that slides, when the upper jacket moves relative to the lower jacket during a secondary impact, relative to at least one of the supporting member and the lower jacket so as to generate a resistive force against movement of the upper jacket, wherein
   the resistive force generating mechanism includes a fixed portion fixed to the holding member, and an extension portion extending in the column axis direction and having a coupled portion that is coupled to the fixed portion at a predetermined location in the column axis direction,
   the clamping mechanism clamps the lower jacket to the upper jacket via the supporting member and the extension portion, and
   the resistive force generating mechanism further includes a coupling stiffness reducing mechanism that reduces coupling stiffness between the fixed portion and the coupled portion of the extension portion so as to facilitate, when the clamping mechanism clamps the lower jacket to the upper jacket, deflection of the coupled portion of the extension portion relative to the fixed portion in a lateral direction as seen from the column axis direction.

2. The steering apparatus according to claim 1, wherein the coupling stiffness reducing mechanism includes a slit or concave groove that extends in the column axis direction and that is located adjacent to or separated from the extension portion in a vertical direction.

3. The steering apparatus according to claim 1, wherein the coupling stiffness reducing mechanism includes an elastically deformable bent portion or curved portion that couples the fixed portion to the coupled portion of the extension portion and that undulates in the lateral direction as seen from a vertical direction.

4. The steering apparatus according to claim 3, wherein the resistive force generating mechanism includes a limiting portion that limits, to a predetermined limit amount, an amount of deformation of the bent portion or curved portion in the column axis direction during the secondary impact.

5. The steering apparatus according to claim 1, wherein the holding member serves as a first resistive force generating mechanism that generates a first resistive force against the movement of the upper jacket in first relative sliding between the holding member and the upper jacket during the secondary impact, and
the resistive force generating mechanism including the extension portion serves as a second resistive force generating mechanism that generates a second resistive force against the movement of the upper jacket in second relative sliding between the resistive force generating mechanism and at least one of the supporting member and the lower jacket during the secondary impact.

* * * * *